Oct. 31, 1950  I. NESSON  2,528,283
BLADE TERMINAL FOR WINDSHIELD WIPER ARMS
Original Filed Dec. 10, 1943
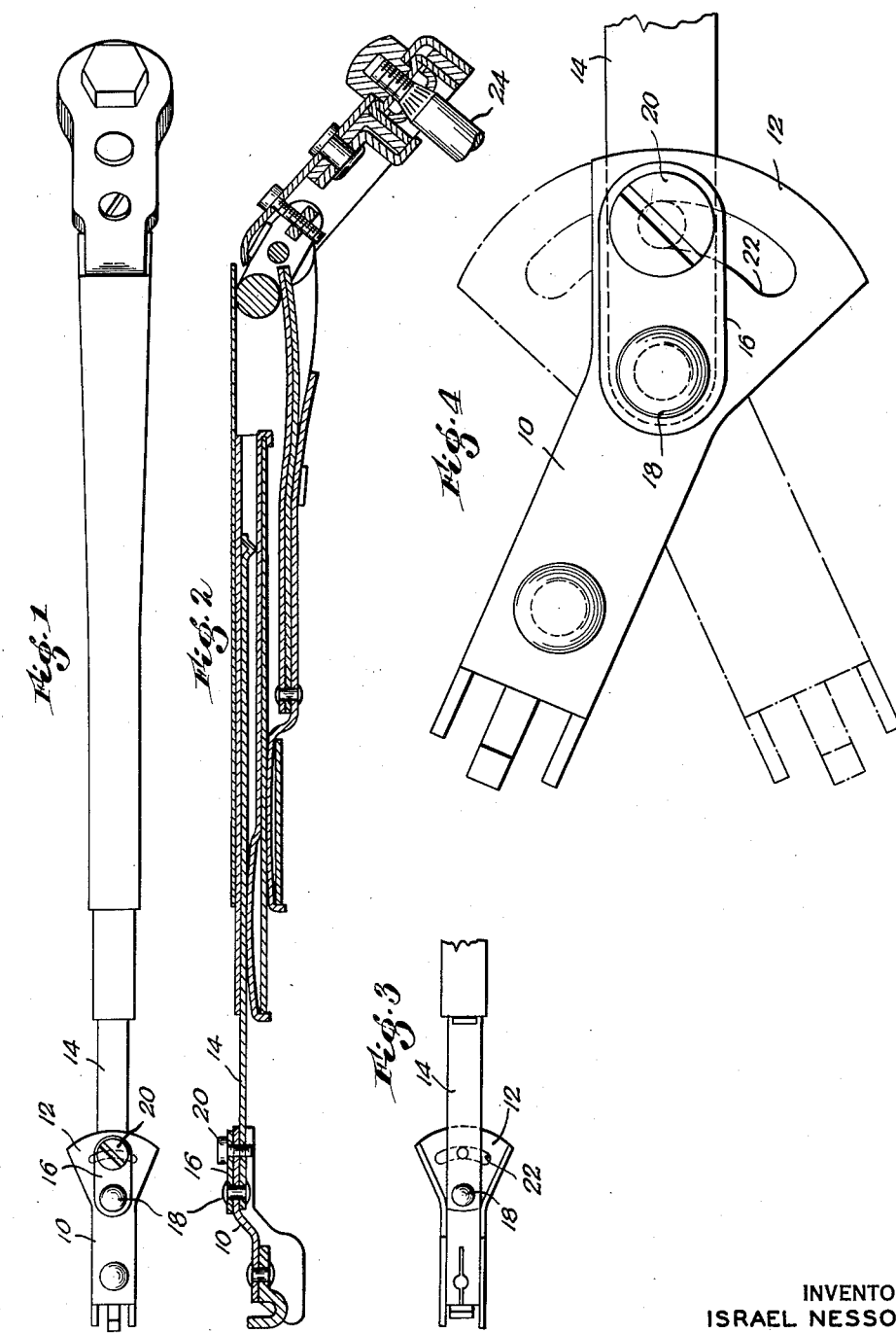
INVENTOR
ISRAEL NESSON
BY *Thomson & Thomson*
ATTORNEYS Patented Oct. 31, 1950

2,528,283

UNITED STATES PATENT OFFICE 2,528,283

BLADE TERMINAL FOR WINDSHIELD WIPER ARMS

Israel Nesson, Lynn, Mass., assignor to Max Zaiger, Swampscott, Mass.

Original application December 10, 1943, Serial No. 513,697, now Patent No. 2,417,991, dated March 25, 1947. Divided and this application March 22, 1947, Serial No. 736,535

1 Claim. (Cl. 15—255)

The present invention relates to windshield wiper arms and pertains more particularly to an improved pivoted terminal for retaining a wiping blade in an adjusted angular position with respect to the arm. This application is a division of my copending application Serial No. 513,697, filed December 10, 1943, and allowed on August 27, 1946, entitled "Windshield Wiper Arm," now Patent No. 2,417,991, dated March 25, 1947.

The principal purpose of the invention is to provide a pivoted terminal or end piece of the character described and claimed in Zaiger Patent No. 2,245,244, but equipped with an improved lock plate which affords a firm, immovable bearing for the adjusting screw and thereby ensures a more secure and efficient clamp for holding the terminal in its angularly adjusted position. In the drawings, Fig. 1 is a plan view of the wiper terminal shown attached to the wiper arm in a straight relationship therewith;

Fig. 2 is a longitudinal section thereof;

Fig. 3 is a bottom view of the wiper terminal shown connected to a fragment of the wiper arm; and Fig. 4 is an enlarged plan view of the terminal shown in an extreme angular relationship with the arm, the dotted line position into which it may be pivoted.

The novel pivoted terminal, to which a windshield wiper blade is attached in the customary fashion, is generally indicated by the reference numeral 10 and operates in the manner described in Zaiger Patent No. 2,295,620. However, the terminal 10 is here provided with an improved feature which ensures a more secure clamping action and greater ease and rapidity of adjustment. As best shown in Figs. 2 and 4, a fan-shaped portion 12 of the end piece 10 rests upon and slides angularly over the end of the arm bar 14 which may form a part of any conventional windshield wiper arm. The terminal 10 and a lock plate 16 are pivoted to arm 14 by a stud 18, the lock plate being uppermost. A terminal adjusting screw 20 passes through a small hole at the rearward end of the plate 16 and through an arcuate slot 22 at the terminal portion 12, and threads into an opening in the bar or arm portion 14.

Thus, the terminal 10 may be swung on its pivot between the bar 14, and the plate 16, while the screw 20 is loosened, but is securely clamped between said members when the screw is tightened. As the screw head engages a relatively large bearing surface of the stationary lock plate, strain upon the pivoted terminal has no tendency to cause the screw to loosen accidentally. Hence, the angular adjustment may be varied when desired without difficulty, yet the adjusted terminal will remain in set position indefinitely.

It will be understood that the terminal 10 is applicable for use in conjunction with any conventional windshield wiper arm, only a slightly modified end construction of such arm at the factory being necessary in order to accommodate the terminal 10 and its described associated parts. The construction of the wiper arm, here shown as the telescoping type, and the means by which the arm is secured to the oscillating motor shaft 24 form no part of the present invention.

While I have described only one embodiment in explaining my invention, it will be appreciated that other structural alterations and modifications are possible within the scope and spirit of the appended claim.

I claim:

In a windshield wiper arm, an arm bar, a terminal connectable to a wiper blade, means pivotally connecting the terminal to the arm bar so that the terminal may be moved angularly relative to the bar, the terminal having a fan-shaped portion bearing on the bar and having an arcuate slot therein, a stationary lock plate disposed on said fan-shaped portion and secured thereto by said connecting means, and a screw passing through said plate and said slot and threading into the bar, the screw having a head bearing on said stationary plate so that the terminal is clamped in adjusted position by tightening said screw.

ISRAEL NESSON.

REFERENCES CITED

The following references are of record in the file of this patent:

UNITED STATES PATENTS

| Number | Name | Date |
|---|---|---|
| 2,290,140 | Anderson | July 14, 1942 |
| 2,295,620 | Zaiger | Sept. 15, 1942 |
| 2,392,670 | Horton | Jan. 8, 1946 |